Sept. 27, 1966      K. W. JOHNSON      3,275,276
SELF-LOCKING CLAMP

Filed March 3, 1965      2 Sheets-Sheet 1

INVENTOR
KENNETH W. JOHNSON
BY
ATTORNEYS

Sept. 27, 1966  K. W. JOHNSON  3,275,276
SELF-LOCKING CLAMP

Filed March 3, 1965  2 Sheets-Sheet 2

INVENTOR
KENNETH W. JOHNSON

BY
ATTORNEYS

United States Patent Office 3,275,276
Patented Sept. 27, 1966

3,275,276
SELF-LOCKING CLAMP
Kenneth W. Johnson, Jamestown, Ohio, assignor, by mesne assignments, to Barry Wright Corporation, Watertown, Mass., a corporation of Massachusetts
Filed Mar. 3, 1965, Ser. No. 436,770
8 Claims. (Cl. 248—361)

This invention relates to a self-locking clamp, and has as its primary object the provision of an improved self-locking clamp which will automatically engage to prevent the loosening of the clamping device under conditions of vibration or the like.

A further objection of the invention is the provision of a device of this character which is particularly adaptable to the mounting and securing of electronic equipment, such, for example, as that used in aircraft where conditions of vibration are always present, in mounting trays, in such manner that accidental loosening of the clamping device is positively precluded.

As conducive to a clearer understanding of this invention, it may here be pointed out that present fastener assemblies of this character consist generally of a screw, a floating ferrule that engages a hook on the equipment, and a threaded wing nut or machine knob. Under such conditions of vibration as are encountered in aircraft, motor vehicles or the like, it is essential that such wing nuts or knobs be effectively secured against loosening, and this has hitherto been done customarily by means of a wire which is tied through holes provided so that the equipment will not become loose under conditions of vibration.

Applicant is aware that there are other types of self-locking clamps in existence which eliminate the need for safety wires. However, in these other types limited use or awkward motion in application inevitably results. As illustrative, one known type of fastener employs a slide lock located on the rear face of the operating knob which, when pushed into locking position, engages flats on opposite sides of the screw. This type is subject to the disadvantage that positive positioning is possible only when the direction of the slide is parallel to the flats, or in two positions in 360 degrees of rotation. At any other position the knob must be backed off, up to as much as 90 degrees to align the parts in a position for fastening. Another type provides engaging teeth between a fixed ferrule and a rotatable knob together with an internal spring that maintain the ferrule and knob in engagement. In order to tighten the associated screw the knob must first be pulled backward to disengage the teeth, then advanced forward and this motion must be repeated with each turn of the knob.

In the present invention, there is provided a ferrule, a knob and a separate finger-movable locking piece, so that during tightening or loosening, the locking ferrule is positioned out of the way so as not to interfere with rotation of the knob, thus obviating all the above mentioned disadvantages of prior art types.

Still another object of the invention is the provision of a device which is easily operable to lock the knob without the use of tools, which will self engage in any angular position of the knob and which, if accidentally placed in unlocked position, will be effectively and automatically locked upon any rotation of the knob.

Still other objects reside in the combinations of elements, arrangement of parts and features of construction, all of which will be pointed out hereinafter and disclosed in the accompanying drawings, wherein.

Similar reference characters refer to similar parts throughout the several views of the drawings.

Figure 1:
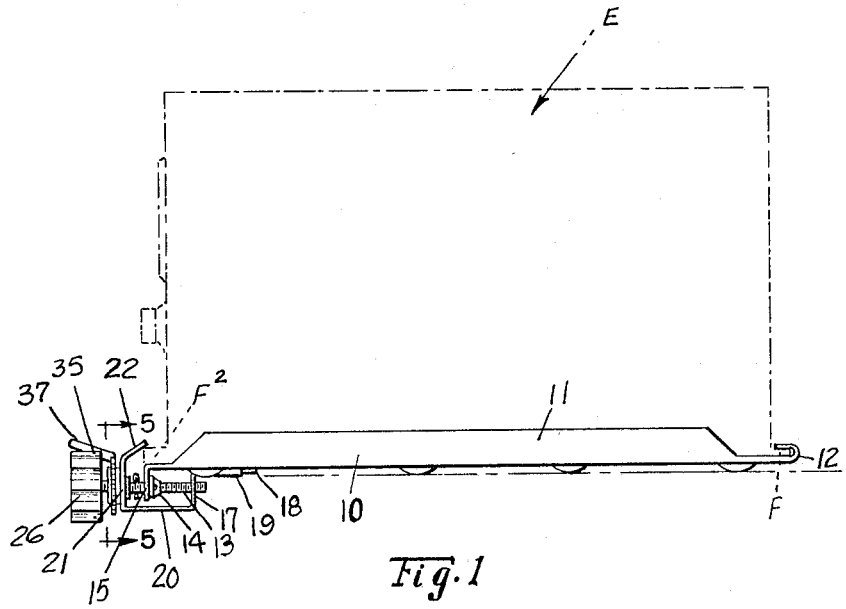
FIGURE 1 is a side elevational view of the locking device of the present invention shown as applied to a locking clamp on a supporting tray, the latter holding a piece of electronic equipment or the like to be clamped therein.
Figure 2:
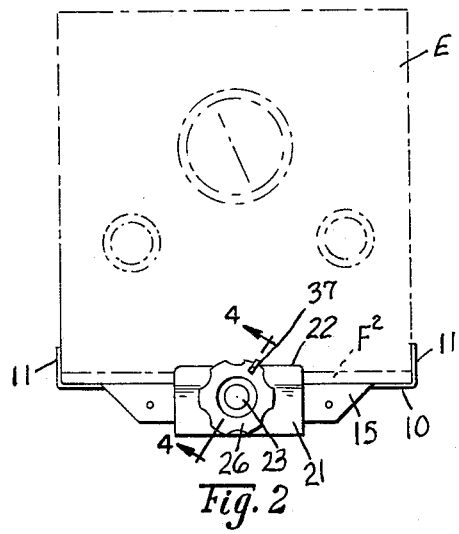
FIGURE 2 is a front elevational view of the structure of FIGURE 1.
Figure 3:
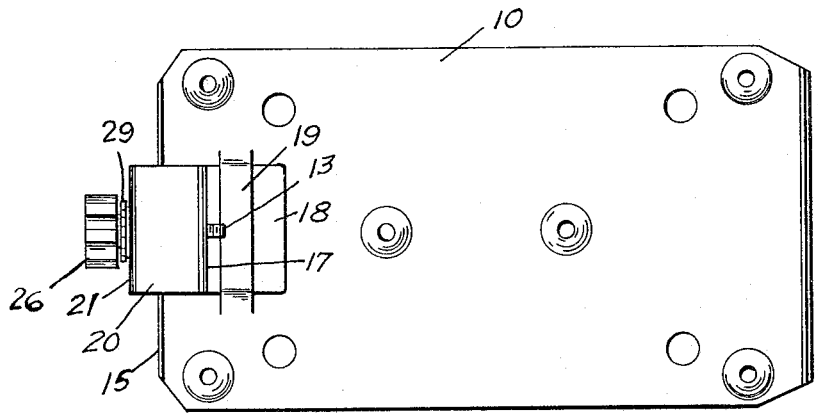
FIGURE 3 is a bottom plan view thereof.
Figure 4:
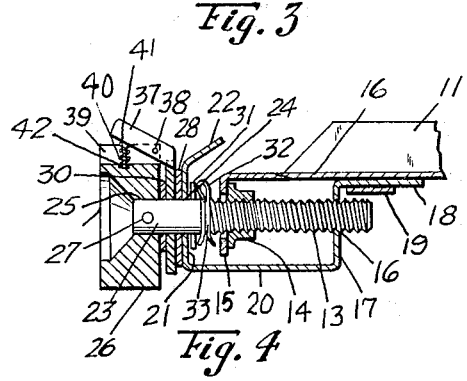
FIGURE 4 is an enlarged sectional view taken substantially along line 4—4 of FIGURE 2.

Referring to the drawings and particularly to FIGURE 1, there is shown at 10 a supporting tray of any desired size for the support of any desired piece of electrical equipment E. In the embodiment shown, the tray includes short vertical flanges 11 and a reverted rear flange 12 which engages over the foot or flange F at the rear of the piece of equipment. Conventionally, such equipment includes a flange in the position shown and a further front flange $F^2$ as shown in FIGURES 1 and 2. A clamping member for flange $F^2$ is disclosed and in the illustrative embodiment shown, comprises a rotatable threaded member 13 which extends through a threaded nut 14 fixedly secured to a depending flange 15, integral with the front of tray 10. Screw or threaded member 13 extends through a guide opening 16 in the rear vertical leg 17 of a movable clamping member, which leg terminates in a relatively horizontal portion 18 which extends in slidable relation through a guide loop 19, which in the illustrative embodiment shown is struck from the bottom of tray 10.

Integral with vertical leg 17 is a bight 20, and a vertical front leg 21, which terminates in a lip 22 which is inwardly inclined, and clampingly engages flange $F^2$ thus effectively clamping, when tightened, the piece of electronic equipment E against movement in tray 10.

Threaded member 13 terminates in a smooth shank 23 which extends through an opening 24 in leg 21 and seats in the central opening 25 of a knurled knob 26 being secured therein as by means of a pin 27.

A spacer 28 is fixed to the outer side of leg 21 and has fixedly secured thereto a disc 29. A friction washer 30 is positioned between disc 29 and knob 26, members 28, 29 and 30 all having openings therein through which extends the smooth shank 23. A washer 31 having a central opening therein surrounds shank 23 on the opposite side of leg 21, and a cotter pin 32 or the like extending through a suitable bore 33 in shank 23 holds the parts in linear related assembly so that linear movement of shank 23 is imparted to leg 21 and hence lip 22. The arrangement is such obviously that rotation of knob 26 rotates threaded bolt 13 in nut 14, moving leg 21 and hence lip 22 inwardly or outwardly into or out of clamping engagement with flange $F^2$.

Figures 5, 6:
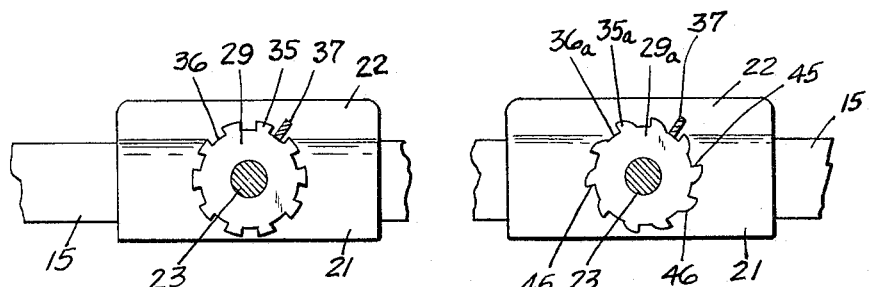
FIGURE 5 is an enlarged sectional view taken substantially along line 5—5 of FIGURE 1; and, FIGURE 6 is a view similar to FIGURE 5 showing a modified form of construction.

The locking device of the instant invention includes disc 29 which, as best shown in FIGURE 5, is provided with a plurality of teeth 35 having vertical sides and spaces 36 therebetween. A metal finger 37 is pivotally mounted on a pin 38 in a slot 39 in the periphery of knob 26 and is normally biased about pin 38 in a direction to engage in one of the spaces 36 by means of a spring 40, one end of which surrounds a lug 41 carried by finger 37, and the other end of which seats in a recess 42 at the bottom of slot 39. The upper or outer end of finger 37 projects outwardly beyond the periphery of the knob, so that when pressed downwardly by the operator its opposite end is cleared from the teeth 35 and the knob and its associated screw may be readily rotated to tighten or loosen clamping lip 22. However, as soon as the knob is released, spring 40 moves finger 37 downwardly into locking position into one of the spaces 36 regardless of its relative position of rotation, so that vibration or other cause will have no rotative effect on the knob or its associated screw, and consequently the assembly will remain tightly clamped. No precise adjustment is necessary since, in the event the knob is in position when finger 37 is released to engage the top of one of teeth 35, any minute movement in either direction caused by vibration or otherwise resulting in rotation of the knob will occasion the finger to engage in the closest adjacent space 36 between the teeth.

FIGURE 6 discloses a slightly modified form of construction, wherein all the components are identical to that of the previous modification except that disc 29a includes teeth 35a and spaces 36a therebetween, but the teeth include one straight side 45 and one arcuate sloping side 46, the arrangement being thus that when the knob is rotated in a clockwise direction to tighten the assembly, finger 37 may ratchet over the teeth, but any reverse rotative movement will be immediately arrested by one of the flat surfaces 45, and disengagement of the assembly may be effected only by release of the finger, as in the case of the previously described modification.

While in the foregoing, the locking device has been described in relation with a particular type clamp for a particular use, it is to be understood that the principles embodied therein may be applied under any circumstances where it is desired to lock a threaded rotatable member against rotative movement for any purpose whatsoever.

From the foregoing, it will now be seen that there is herein provided an improved self-locking clamp which accomplishes all of the objects of this invention, and others including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What is claimed is:

1. A self-locking clamp comprising a fixed jaw member and a movable jaw member, a threaded member extending through said movable jaw and secured against linear movement relative thereto and threadedly engaging through means carried by said fixed jaw whereby rotative movement of said screw moves said movable jaw relative to said fixed jaw, a knob on the end of said screw which extends through said movable jaw, a toothed disc fixed to said movable jaw between said movable jaw and said knob and surrounding said screw, and a finger pivoted on said knob selectively movable into and out of engagement with the teeth of said disc to preclude rotation of said knob and said screw when engaged with said teeth.

2. The structure of claim 1 wherein spring means normally bias said finger into tooth engaging relation.

3. The structure of claim 2 wherein said toothed knob includes a plurality of spaced teeth having substantially straight edges on both sides defining substantially right angled recesses therebetween.

4. The structure of claim 2 wherein said knob includes teeth having one straight side and one inclined side whereby said finger may ratchet thereover during rotation in one direction.

5. The structure of claim 2 wherein said knob is provided with a radial slot extending therethrough and said finger is pivoted in said slot.

6. The structure of claim 5 wherein said spring means includes a coil spring having one end seated in a recess in the bottom of said slot and the other end engaging a lug on the underside of said finger.

7. The structure of claim 2 wherein a friction washer is interposed between said disc and said knob.

8. The structure of claim 1 wherein said threaded member includes a movable shank which passes through aligned openings in said movable jaw, said disc and said knob, and a transverse bore is extended through said shank on the side of said movable jaw opposite said knob, the means securing said threaded member against linear movement relative to said jaw comprising a cotter pin extended through said bore.

References Cited by the Examiner
UNITED STATES PATENTS

| | | | |
|---|---|---|---|
| 1,122,995 | 12/1914 | Parris | 151—40 |
| 2,630,996 | 3/1953 | Lauther | 248—361 |
| 2,917,266 | 12/1959 | Sanborn et al. | 248—361 |
| 3,212,746 | 10/1965 | Wright | 248—361 |

CLAUDE A. LE ROY, *Primary Examiner.*

J. F. FOSS, *Assistant Examiner.*